(12) United States Patent
Fushiwaki et al.

(10) Patent No.: US 10,837,074 B2
(45) Date of Patent: *Nov. 17, 2020

(54) METHOD FOR MANUFACTURING HIGH STRENGTH GALVANIZED STEEL SHEET AND HIGH STRENGTH GALVANIZED STEEL SHEET

(71) Applicant: JFE STEEL CORPORATION, Chiyoda (JP)

(72) Inventors: Yusuke Fushiwaki, Manchester (GB); Yoshiyasu Kawasaki, Chiba (JP); Yasunobu Nagataki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 611 days.

This patent is subject to a terminal disclaimer.

(21) Appl. No.: 14/384,298

(22) PCT Filed: Mar. 7, 2013

(86) PCT No.: PCT/JP2013/001458
§ 371 (c)(1),
(2) Date: Sep. 10, 2014

(87) PCT Pub. No.: WO2013/140729
PCT Pub. Date: Sep. 26, 2013

(65) Prior Publication Data
US 2015/0044503 A1    Feb. 12, 2015

(30) Foreign Application Priority Data

Mar. 19, 2012   (JP) .................................. 2012-061313

(51) Int. Cl.
| | | |
|---|---|---|
| *C21D 9/46* | (2006.01) |
| *C23C 2/28* | (2006.01) |
| *C22C 38/06* | (2006.01) |
| *C22C 38/02* | (2006.01) |
| *B32B 15/01* | (2006.01) |
| *C22C 38/04* | (2006.01) |
| *C22C 38/00* | (2006.01) |
| *C23C 2/06* | (2006.01) |
| *C21D 1/26* | (2006.01) |
| *C21D 6/00* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/38* | (2006.01) |
| *C23C 2/36* | (2006.01) |
| *C23F 17/00* | (2006.01) |
| *B62D 29/00* | (2006.01) |

(52) U.S. Cl.
CPC .............. *C21D 9/46* (2013.01); *B32B 15/013* (2013.01); *C21D 1/26* (2013.01); *C21D 6/001* (2013.01); *C21D 6/002* (2013.01); *C21D 6/005* (2013.01); *C21D 6/008* (2013.01); *C22C 38/00* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/38* (2013.01); *C23C 2/06* (2013.01); *C23C 2/28* (2013.01); *C23C 2/36* (2013.01); *C23F 17/00* (2013.01); *B62D 29/007* (2013.01); *Y02P 10/212* (2015.11); *Y10T 428/12799* (2015.01)

(58) Field of Classification Search
CPC .................................. C21D 9/46; C21D 6/005
USPC .......................................................... 148/533
See application file for complete search history.

(56) References Cited

U.S. PATENT DOCUMENTS

| | | |
|---|---|---|
| 5,141,606 A | 8/1992 | Matsumoto et al. |
| 8,778,097 B2 | 7/2014 | Chin et al. |
| 8,999,084 B2 | 4/2015 | Fushiwaki et al. |
| 9,074,275 B2 * | 7/2015 | Fushiwaki .............. C22C 38/02 |
| 9,452,792 B2 | 9/2016 | Takagi et al. |

(Continued)

FOREIGN PATENT DOCUMENTS

| | | |
|---|---|---|
| CA | 2811489 A1 | 4/2012 |
| CN | 102224269 A | 10/2011 |

(Continued)

OTHER PUBLICATIONS

European Search Report dated Jul. 3, 2015 in European Application No. 13764796.2.

(Continued)

*Primary Examiner* — Weiping Zhu
(74) *Attorney, Agent, or Firm* — RatnerPrestia

(57) ABSTRACT

A method for manufacturing a high strength galvanized steel sheet and a high strength galvanized steel sheet are provided. A base steel sheet having a chemical composition comprising C: 0.03% to 0.35%, Si: 0.01% to 0.50%, Mn: 3.6% to 8.0%, Al: 0.001% to 1.000%, P≤0.10%, S≤0.010%, and the balance comprising Fe and incidental impurities, on a percent by mass basis, is subjected to annealing and galvanization treatment, wherein the maximum steel sheet temperature in an annealing furnace is 600° C. or higher and 700° C. or lower, the steel sheet transit time in a temperature region of the maximum steel sheet temperature of 600° C. or higher and 700° C. or lower is specified to be 30 seconds or more and 10 minutes or less, and the dew point in an atmosphere is specified to be −45° C. or lower.

6 Claims, No Drawings

(56) References Cited

U.S. PATENT DOCUMENTS

| | | | |
|---|---|---|---|
| 2008/0008901 A1* | 1/2008 | Sugiura | C21D 9/46 428/639 |
| 2011/0083774 A1* | 4/2011 | Jin | C21D 6/005 148/533 |
| 2012/0090737 A1 | 4/2012 | Fushiwaki et al. | |
| 2013/0327452 A1 | 12/2013 | Fushiwaki et al. | |
| 2015/0013851 A1 | 1/2015 | Takahashi | |
| 2015/0044503 A1 | 2/2015 | Fushiwaki et al. | |
| 2016/0002762 A1 | 1/2016 | Fushiwaki et al. | |
| 2016/0289784 A1* | 10/2016 | Fushiwaki | C21D 1/76 |

FOREIGN PATENT DOCUMENTS

| | | |
|---|---|---|
| CN | 103582714 A | 2/2014 |
| CN | 104220628 A | 12/2014 |
| CN | 104508156 A | 4/2015 |
| EP | 1865085 A1 | 12/2007 |
| EP | 2381004 A1 | 10/2011 |
| EP | 2407572 A1 | 1/2012 |
| EP | 2415896 A1 | 2/2012 |
| EP | 2708610 A1 | 3/2014 |
| EP | 2829627 A1 | 1/2015 |
| JP | 55145122 A | 11/1980 |
| JP | 05320952 A | 12/1993 |
| JP | 0610096 A | 1/1994 |
| JP | 0881748 A | 3/1996 |
| JP | 2001140021 A | 5/2001 |
| JP | 2003113441 A | 4/2003 |
| JP | 2003-138345 A | 5/2003 |
| JP | 2004-315960 A | 11/2004 |
| JP | 2004-323970 | 11/2004 |
| JP | 2004323969 A | 11/2004 |
| JP | 2005248281 A | 9/2005 |
| JP | 2006045615 A | 2/2006 |
| JP | 2006-233333 A | 9/2006 |
| JP | 2007-046146 A | 2/2007 |
| JP | 2007262464 A | 10/2007 |
| JP | 2008-024980 A | 2/2008 |
| JP | 2008255442 A | 10/2008 |
| JP | 2009-518541 A | 5/2009 |
| JP | 2009-287114 A | 12/2009 |
| JP | 2010126757 A | 6/2010 |
| JP | 2010-150660 A | 7/2010 |
| JP | 2010-255110 A | 11/2010 |
| JP | 2010255109 | 11/2010 |
| JP | 2010255109 A * | 11/2010 |
| JP | 2010255111 A | 11/2010 |
| JP | 2011219778 A | 11/2011 |
| JP | 4843982 B2 | 12/2011 |
| JP | 2012072451 A | 4/2012 |
| JP | 2012072452 A | 4/2012 |
| JP | 2012251239 A | 12/2012 |
| JP | 2013124382 A | 6/2013 |
| JP | 2013136809 A | 7/2013 |
| JP | 2013147681 A | 8/2013 |
| JP | 2013194270 A | 9/2013 |
| JP | 2014015675 A | 1/2014 |
| JP | 2014015676 A | 1/2014 |
| KR | 20090120759 A | 11/2009 |
| KR | 1020090120759 | 11/2009 |
| KR | 20120023617 A | 3/2012 |
| WO | WO 2007/067014 A1 | 6/2007 |
| WO | 2009142362 | 11/2009 |
| WO | 2009142362 A1 | 11/2009 |
| WO | 2012042677 A1 | 4/2012 |
| WO | 2014017010 A1 | 1/2014 |

OTHER PUBLICATIONS

International Search Report dated Jun. 4, 2013, application No. PCT/JP2013/001458.
Korean Notice of Allowance for Korean Application No. 2014-7027768, dated Oct. 24, 2016, 7 pages.
U.S. Final Office Action for U.S. Appl. No. 14/771,270, dated Jul. 12, 2017, 34 pages.
Chinese Office Action for Chinese Application No. 201580009186X, dated Dec. 12, 2017, including Concise Statement of Search Report—9 pages.
Chinese Office Action for Chinese Application No. 201480012075.X, dated Jan. 26, 2017, including Concise Statement of Search Report—9 pages.
Chinese Office Action for Chinese Application No. 201480012075.X, dated Jul. 19, 2016, including Concise Statement of Search Report—21 pages.
Chinese Office Action for Chinese Application No. 201480012075.X, dated Jun. 28, 2017, including Concise Statement of Search Report—7 pages.
Chinese Office Action for Chinese Application No. 201580009186.X, dated May 3, 2018, including Concise Statement of Search Report—9 pages.
Chinese Office Action for Chinese Application No. 201480012075.X, dated Sep. 26, 2017, including Concise Statement of Search Report—4 pages.
European Communication for European Application No. 14 760 083.7, dated Dec. 5, 2017—8 pages.
Extended European Search Report for European Application No. 14 760 083.7, dated Jan. 22, 2016—8 pages.
Final Office Action for U.S. Appl. No. 14/384,298, dated Oct. 17, 2017—7 pages.
International Preliminary Report on Patentability for Application No. PCT/JP2014/001082, dated Sep. 8, 2015—5 pages.
International Search Report and Written Opinion for International Application No. PCT/JP2015/000536, dated Apr. 28, 2015—5 pages.
International Search Report for International Application No. PCT/JP2014/001082, dated May 27, 2014—2 pages.
Japanese Office Action for Japanese Application No. 2014028693, with partial English language translation, dated Sep. 15, 2015—4 pages.
Japanese Office Action for Japanese Application No. 2013042456, dated Sep. 29, 2015—6 pages.
Korean Notice of Allowance for Korean Application No. 10 2015 7027118, dated Dec. 27, 2016—2 pages.
Korean Office Action for Korean Application No. 10 2016 7025583, dated Jun. 17, 2017—6 pages.
Korean Office Action for Korean Application No. 10 2015 7027118, dated Jun. 21, 2016—7 pages.
Korean Office Action for Korean Application No. 10 2016 7025583, dated Nov. 6, 2017—3 pages.
Non Final Office Action for U.S. Appl. No. 14/384,298, dated Apr. 2, 2018—8 pages.
Non Final Office Action for U.S. Appl. No. 14/911,795, dated Feb. 13, 2018—8 pages.
Non Final Office Action for U.S. Appl. No. 14/384,298, dated Jun. 23, 2017—17 pages.
Non Final Office Action for U.S. Appl. No. 14/771,270, dated May 23, 2018—21 pages.
Written Opinion for International Application No. PCT/JP2014/001082, dated May 27, 2014—4 pages.
Non Final Office Action for U.S. Appl. No. 15/118,231, dated Jun. 22, 2018, 43 pages.
Supplementary European Search Report for Application No. EP 15 75 2400, dated Feb. 1, 2017, 11 pages.
Final Office Action for U.S. Appl. No. 15/118,231, dated Oct. 26, 2018, 18 pages.
Non Final Office Action for U.S. Appl. No. 15/038,223, dated Jun. 12, 2019, 43 pages.
Final Office Action for U.S. Appl. No. 15/038,223, dated Sep. 18, 2019, 9 pages.

* cited by examiner

METHOD FOR MANUFACTURING HIGH STRENGTH GALVANIZED STEEL SHEET AND HIGH STRENGTH GALVANIZED STEEL SHEET

CROSS REFERENCE TO RELATED APPLICATIONS

This is the U.S. National Phase application of PCT/JP2013/001458, filed Mar. 7, 2013, which claims priority to Japanese Patent Application No. 2012-061313, filed Mar. 19, 2012, the disclosures of each of these applications being incorporated herein by reference in their entireties for all purposes.

FIELD OF THE INVENTION

The present invention relates to a method for manufacturing a high strength galvanized steel sheet including a Si- and Mn-containing high strength steel sheet, as a base steel sheet, and having excellent coating appearance, corrosion resistance, coating peel resistance at severe forming, and formability, and a high strength galvanized steel sheet.

BACKGROUND OF THE INVENTION

In recent years, in the fields of automobiles, home appliances, constructions, and the like, coated steel sheets in which rust preventive properties are given to base steel sheets, most of all, galvanized steel sheets and galvannealed steel sheets, have been used widely. Also, from the viewpoint of enhancement of fuel economy of automobiles and improvement in crash safety of automobiles, there are increasing demands to reduce the weight and enhance the strength of a car body in itself by reducing the thickness through enhancement in strength of car body materials. Consequently, application of high strength steel sheets to automobiles has been promoted.

In general, a galvanized steel sheet is produced by using a steel sheet, as a base steel sheet, prepared through hot rolling and cold rolling of a slab and subjecting the base steel sheet to recrystallization annealing and galvanization treatment in a continuous galvanizing line (hereafter referred to as CGL). A galvannealed steel sheet is produced by further performing alloying treatment after the galvanization treatment.

Here, examples of annealing furnace type of CGL include DFF type (direct fire type), NOF type (non-oxidation type), and all radiant tube type. In recent years, construction of CGL provided with a furnace of all radiant tube type has increased for the reason that, for example, a high quality coated steel sheet can be produced at a low cost because of ease of operation, difficulty in occurrence of pick up, and the like. However, in contrast to the DFF type (direct fire type) and the NOF type (non-oxidation type), the all radiant tube type has no oxidation step just before annealing and, therefore, is disadvantageous to a steel sheet containing easy-to-oxidize elements, e.g., Si and Mn, from the viewpoint of ensuring of the wettability.

As for methods for manufacturing a galvanized steel sheet, where a high strength steel sheet containing large amounts of Si and Mn is used as a base steel sheet, Patent Literature 1 discloses a method comprising steps of annealing at a recrystallization temperature to 900° C. and of coating. Patent Literature 2 discloses a method comprising steps of annealing at 750° C. to 900° C. and of coating. Patent Literature 3 discloses a method comprising steps of annealing at 800° C. to 850° C. and of coating. However, in the case where the high strength steel sheet containing large amounts of Si and Mn is annealed at a temperature higher than 750° C., Si and Mn in steel are selectively oxidized to form oxides on the steel sheet surface, so that adhesion of coating may be degraded and defects, e.g., coating defects, may be generated.

In addition, Patent Literature 4 and Patent Literature 5 disclose methods in which internal oxidation of steel surface layer is induced by specifying a heating temperature in a reducing furnace on the basis of a formula represented by water vapor partial pressure and increasing a dew point. However, it is assumed that a dew point control area is the whole inside of the furnace and, therefore, control of the dew point is difficult and stable operation is difficult. Meanwhile, in production of a galvannealed steel sheet under unstable dew point control, variations are observed in the distribution of internal oxides formed in the base steel sheet, and defects, e.g., variations in wettability and alloying, may occur in the longitudinal direction or the transversal direction of steel strip.

Also, Patent Literature 6 discloses a method to improve the coating appearance by specifying not only the concentration of $H_2O$ and $O_2$, which are oxidizing gases, but also the concentration of $CO_2$ at the same time so as to induce internal oxidation of steel surface layer just before coating and suppress external oxidation. However, according to Patent Literature 6, cracking may occur easily in forming because of presence of internal oxides and the coating peel resistance is degraded. In addition, degradation in corrosion resistance is also observed. Furthermore, $CO_2$ causes pollution in the furnace, carburization of the steel sheet surface, and the like and problems may occur in that, for example, mechanical characteristics are changed.

Moreover, applications of high strength galvanized steel sheets and high strength galvannealed steel sheets to parts to be severely formed have been promoted recently, and coating peel resistance characteristics at severe forming have been valued. Specifically, when a coated steel sheet is subjected to bending of more than 90° and is bent to an acuter angle or when a coated steel sheet is formed by impact, suppression of coating peel in a formed portion is required.

In order to satisfy such requirements, not only ensuring of desired microstructure of a base steel sheet by addition of large amounts of Si to the steel but also higher level of control of microstructure and structure of surface layer of the base steel sheet just below the coating layer, which may become a starting point of cracking and the like at severe forming, are preferred. However, it is difficult for the conventional arts described above to perform such control and it is not possible to produce a galvanized steel sheet having excellent coating peel resistance at severe forming by using a Si-containing high strength steel sheet as a base steel sheet in a CGL provided with a furnace of all radiant tube type as an annealing furnace.

PATENT LITERATURE

PTL 1: Japanese Unexamined Patent Application Publication No. 2009-287114
PTL 2: Japanese Unexamined Patent Application Publication No. 2009-518541
PTL 3: Japanese Unexamined Patent Application Publication No. 2010-150660
PTL 4: Japanese Unexamined Patent Application Publication No. 2004-323970

PTL 5: Japanese Unexamined Patent Application Publication No. 2004-315960

PTL 6: Japanese Unexamined Patent Application Publication No. 2006-233333

The present invention has been made in consideration of such circumstances and it is an object to provide a method for manufacturing a high strength galvanized steel sheet including a Si- and Mn-containing steel sheet, as a base steel sheet, and having excellent coating appearance, corrosion resistance, coating peel resistance at severe forming and formability, and a high strength galvanized steel sheet.

Until now, for the purpose of improving the wettability, Fe has been oxidized or internal oxidation has been induced positively. However, at the same time, the corrosion resistance and the formability are degraded. Then, the present inventors studied a new method for solving the issues, where the method was free from previously known ideas. As a result, it was found that internal oxidation in the base steel sheet surface layer just below the zinc coating layer was suppressed and excellent coating appearance, higher corrosion resistance, and good coating peel resistance at severe forming were obtained by controlling the atmosphere and the temperature in an annealing step appropriately. Specifically, an annealing is applied, followed by galvanizing, while a maximum steel sheet temperature in an annealing furnace is controlled to be 600° C. or higher and 700° C. or lower, a steel sheet transit time in a temperature region of the maximum steel sheet temperature of 600° C. or higher and 700° C. or lower is controlled to be 30 seconds or more and 10 minutes or less, and a dew point in an atmosphere is controlled to be −45° C. or lower. The oxygen potential at the interface between the steel sheet and the atmosphere is reduced and selective surface diffusion and oxidation (hereafter referred to as surface concentration) of Si, Mn, and the like are suppressed while an occurrence of internal oxidation is minimized by specifying the maximum steel sheet temperature in the annealing furnace to be 600° C. or higher and 700° C. or lower and specifying the dew point in the atmosphere in the temperature region of the maximum steel sheet temperature of 600° C. or higher and 700° C. or lower to be −45° C. or lower. The annealing temperature and the dew point in the atmosphere are controlled as described above and, thereby, a high strength galvanized steel sheet with no coating defect is obtained having excellent coating appearance, corrosion resistance, and coating peel resistance at severe forming while internal oxidation is not caused and surface concentration is minimized. In this regard, the term "having excellent coating appearance" refers to have an appearance in which coating defects and alloying variations are not observed.

In the high strength galvanized steel sheet obtained by the above-described method, formation of oxides of at least one selected from Fe, Si, Mn, Al, P, and in addition, B, Nb, Ti, Cr, Mo, Cu, and Ni (excluding the case of Fe only) is suppressed in the surface layer within 100 μm from the base steel sheet surface just below the zinc coating layer, and the amount thereof in total is reduced to less than 0.030 g/m² per one surface. Consequently, excellent coating appearance is exhibited, corrosion resistance is improved significantly, prevention of cracking in bending of steel surface layer is realized, and excellent coating peel resistance at severe forming is exhibited.

The present invention is on the basis of the above-described findings and the preferred features are as described below.

[1] A method for manufacturing a high strength galvanized steel sheet having a zinc coating layer with an amount of deposition of coating of 20 to 120 g/m² per one surface on the surface of a base steel sheet having a chemical composition comprising C, 0.03% to 0.35%, Si: 0.01% to 0.50%, Mn: 3.6% to 8.0%, Al: 0.001% to 1.000%, P≤0.10%, S≤0.010%, and the balance comprising Fe and incidental impurities, on a percent by mass basis, the method including the step of subjecting the base steel sheet to annealing and galvanization treatment in a continuous galvanizing line, characterized in that the maximum steel sheet temperature in an annealing furnace is 600° C. or higher and 700° C. or lower, the steel sheet transit time in a temperature region of the maximum steel sheet temperature of 600° C. or higher and 700° C. or lower is specified to be 30 seconds or more and 10 minutes or less, and the dew point in an atmosphere is specified to be −45° C. or lower.

[2] The method for manufacturing a high strength galvanized steel sheet, according to [1], characterized in that the chemical composition further contains at least one selected from B: 0.001% to 0.005%, Nb: 0.005% to 0.050%, Ti: 0.005% to 0.050%, Cr: 0.001% to 1.000%, Mo: 0.05% to 1.00%, Cu: 0.05% to 1.00%, and Ni: 0.05% to 1.0%, on a percent by mass basis.

[3] The method for manufacturing a high strength galvanized steel sheet, according to [1] or [2], characterized in that after the galvanization treatment is applied, an alloying treatment is further applied by heating the steel sheet to a temperature of 450° C. or higher and 600° C. or lower to specify the Fe content in the zinc coating layer to be within the range of 8 to 14 percent by mass.

[4] A high strength galvanized steel sheet produced by the manufacturing method according to any one of [1] to [3], characterized in that the amount of oxides of Fe, Si, Mn, Al, P, B, Nb, Ti, Cr, Mo, Cu, and Ni generated in a surface layer within 100 μm from the base steel sheet surface just below the zinc coating layer are less than 0.030 g/m² per one surface.

In this regard, in the present invention, the high strength galvanized steel sheet refers to a steel sheet having a tensile strength TS of 590 MPa or more. Also, the high strength galvanized steel sheets in the present invention include all coated steel sheets not subjected to an alloying treatment after the galvanization treatment (hereafter may be referred to as GI) and coated steel sheets subjected to an alloying treatment after the galvanization treatment (hereafter may be referred to as GA).

According to the present invention, a high strength galvanized steel sheet having excellent coating appearance, corrosion resistance, coating peel resistance at severe forming, and formability can be obtained.

DETAILED DESCRIPTION OF EMBODIMENTS OF THE INVENTION

The present invention will be specifically described below. In this regard, in the following explanations, all units of the contents of the individual elements of the steel chemical composition and the contents of the individual elements of the coating layer chemical composition are "percent by mass" and are hereafter expressed as "%" unless otherwise specified.

To begin with, the annealing condition, which is the most beneficial feature in the present invention, to determine the structure of the base steel sheet surface just below the zinc coating layer will be described.

In order to satisfy the corrosion resistance and the coating peel resistance at severe forming of a high strength galvanized steel sheet in which large amounts of Si and Mn have been added to the base steel sheet, it is preferred to minimize internal oxidation, which may become a starting point of corrosion, cracking at severe forming, and the like, of the base steel surface layer just below the zinc coating layer.

The wettability can be improved by oxidizing Fe or facilitating internal oxidation of Si and Mn. However, conversely, this causes degradation in corrosion resistance and formability. Consequently, it is necessary that the internal oxidation be suppressed and the corrosion resistance and the formability be improved, while good wettability is maintained, by a method other than the method in which the internal oxidation of Si and Mn is facilitated. As a result of studies, in the present invention, in order to ensure the wettability, the oxygen potential is preferably reduced in the annealing step and the activities of Si, Mn, and the like serving as easy-to-oxidize elements are preferably reduced in the base steel surface layer. Such reduction in the activity suppresses external oxidation of these elements and, as a result, the wettability is improved. Also, internal oxidation formed in the base steel surface layer is suppressed and the corrosion resistance and the formability are improved.

Such effects are obtained by specifying a maximum steel sheet temperature in an annealing furnace to be 600° C. or higher and 700° C. or lower, a steel sheet transit time in a temperature region of the maximum steel sheet temperature of 600° C. or higher and 700° C. or lower to be 30 seconds or more and 10 minutes or less, and a dew point in an atmosphere to be −45° C. or lower in annealing, followed by galvanizing, in a continuous galvanizing line. Such controls reduce the oxygen potential at the interface between the steel sheet and the atmosphere and suppress selective surface diffusion and surface concentration of Si, Mn, and the like without inducing internal oxidation. Consequently, higher corrosion resistance and good coating peel resistance at severe forming are obtained without causing coating defects.

The maximum steel sheet temperature in an annealing furnace is specified to be 600° C. or higher and 700° C. or lower for the reason described below. In the temperature region of lower than 600° C., surface concentration and internal oxidation do not occur to such an extent that occurrence of coating defect, degradation in corrosion resistance, degradation in coating peel resistance, and the like become problems. However, good mechanical properties of the galvanized steel sheet are not obtained at lower than 600° C. Therefore, the maximum steel sheet temperature at which the effects of the present invention are exerted is preferably specified to be 600° C. or higher. On the other hand, in the temperature range of higher than 700° C., surface concentration becomes significant, occurrence of coating defect, degradation in corrosion resistance, degradation in coating peel resistance, and the like become considerable. In addition, from the viewpoint of the mechanical properties, the balance between the strength TS and the elongation El is saturated in the temperature range of higher than 700° C. Consequently, the maximum steel sheet temperature is specified to be 600° C. or higher and 700° C. or lower.

Next, the steel sheet transit time in a temperature region of the maximum steel sheet temperature of 600° C. or higher and 700° C. or lower is specified to be 30 seconds or more and 10 minutes or less for the reason described below. If the steel sheet transit time is less than 30 seconds, the predetermined mechanical properties (TS, El) are not obtained. On the other hand, if the steel sheet transit time is more than 10 minutes, the balance between the TS and the El is saturated. The dew point in a temperature region of the maximum steel sheet temperature of 600° C. or higher and 700° C. or lower is specified to be −45° C. or lower for the reason described below. The effect of suppressing surface concentration is observed at a dew point of −45° C. or lower. The lower limit of the dew point is not specified, although −80° C. or higher is desirable because the effect is saturated at −80° C. or lower and there is a cost disadvantage.

Next, the base steel chemical composition of the high strength galvanized steel sheet according to embodiments of the present invention, will be described.

C, 0.03% to 0.35%

Carbon improves the formability by forming martensite and the like in a microstructure. For that purpose, 0.03% or more is necessary. On the other hand, if 0.35% is exceeded, the weldability is degraded. Therefore, the amount of C is specified to be 0.03% or more and 0.35% or less.

Si: 0.01% to 0.50%

Silicon is an element effective in enhancing the strength of steel and obtaining good mechanical properties but is an easy-to-oxidize element, so that there is a wettability disadvantage and addition of Si element is avoided as much as possible. However, about 0.01% is contained in steel incidentally and reduction to less than or equal to that causes an increase in cost. Then, the lower limit is specified to be 0.01%. On the other hand, if 0.50% is exceeded, improvement in coating peel resistance at severe forming becomes difficult. Therefore, the amount of Si is specified to be 0.01% or more and 0.50% or less.

Mn: 3.6% to 8.0%

Manganese is an element effective in enhancing the strength of steel. In order to ensure the mechanical properties including the strength, it is necessary that the amount of Mn be 3.6% or more. On the other hand, if 8.0% is exceeded, it becomes difficult to ensure the weldability and the adhesion of coating and ensure the balance between the TS and the El. Therefore, the amount of Mn is specified to be 3.6% or more and 8.0% or less.

Al: 0.001% to 1.000%

Aluminum is added for the purpose of deoxidizing a molten steel. However, if the amount of Al is less than 0.001%, the purpose is not achieved. The effect of deoxidizing a molten steel is obtained when the amount of Al is 0.001% or more. On the other hand, if 1.000% is exceeded, the cost increases. Therefore, the amount of Al is specified to be 0.001% or more and 1.000% or less.

P≤0.10%

Phosphorus is one of elements contained incidentally. Reduction the amount of P to less than 0.005% may increase the cost, so that 0.005% or more is desirable. On the other hand, if the content of P is more than 0.10%, the weldability is degraded. Furthermore, the surface quality is degraded. Meanwhile, the adhesion of coating is degraded when an alloying treatment is not applied, and in the alloying treatment, a desired alloying cannot be achieved unless the alloying treatment temperature is increased. In addition, in the case where the alloying treatment temperature is increased to achieve the desired alloying, the ductility is degraded and, at the same time, the adhesion of alloyed coating film is degraded, so that the compatibility between desired alloying and good ductility and adhesion of alloyed coating film cannot be ensured. Therefore, the amount of P is specified to be 0.10% or less, and the lower limit is desirably 0.005% or more.

S≤0.010%

Sulfur is one of elements contained incidentally. Although the lower limit is not specified, 0.010% or less is preferable because if a large amount is contained, the weldability is degraded.

In this regard, in order to control the balance between the TS and the El, at least one selected from B: 0.001% to 0.005%, Nb: 0.005% to 0.050%, Ti: 0.005% to 0.050%, Cr: 0.001% to 1.000%, Mo: 0.05% to 1.00%, Cu: 0.05% to 1.00%, and Ni: 0.05% to 1.00% may be added as necessary. In the case where these elements are added, appropriate amounts of addition are specified for the reasons described below.

B: 0.001% to 0.005%

If B is less than 0.001%, a hardenability-promoting effect is not obtained easily. On the other hand, if 0.005% is exceeded, the adhesion of coating is degraded. Therefore, in the case where B is contained, the amount of B is specified to be 0.001% or more and 0.005% or less.

Nb: 0.005% to 0.050%

If Nb is less than 0.005%, an effect of adjusting the strength and an effect of improving the adhesion of coating when added in combination with Mo are not obtained easily. On the other hand, if 0.050% is exceeded, an increase in cost is caused. Therefore, in the case where Nb is contained, the amount of Nb is specified to be 0.005% or more and 0.050% or less.

Ti: 0.005% to 0.050%

If Ti is less than 0.005%, an effect of adjusting the strength is not obtained easily. On the other hand, if 0.050% is exceeded, the adhesion of coating is degraded. Therefore, in the case where Ti is contained, the amount of Ti is specified to be 0.005% or more and 0.050% or less.

Cr: 0.001% to 1.000%

If Cr is less than 0.001%, a hardenability effect is not obtained easily. On the other hand, if 1.000% is exceeded, the adhesion of coating and the weldability are degraded because surface concentration of Cr occurs. Therefore, in the case where Cr is contained, the amount of Cr is specified to be 0.001% or more and 1.000% or less.

Mo: 0.05% to 1.00%

If Mo is less than 0.05%, an effect of adjusting the strength and an effect of improving the adhesion of coating when added in combination with Nb, Ni or Cu are not obtained easily. On the other hand, if 1.00% is exceeded, an increase in cost is caused. Therefore, in the case where Mo is contained, the amount of Mo is specified to be 0.05% or more and 1.00% or less.

Cu: 0.05% to 1.00%

If Cu is less than 0.05%, an effect of promoting the formation of retained $\gamma$ phase and an effect of improving the adhesion of coating when added in combination with Ni or Mo are not obtained easily. On the other hand, if 1.00% is exceeded, an increase in cost is caused. Therefore, in the case where Cu is contained, the amount of Cu is specified to be 0.05% or more and 1.00% or less.

Ni: 0.05% to 1.00%

If Ni is less than 0.05%, an effect of promoting the formation of retained $\gamma$ phase and an effect of improving the adhesion of coating when added in combination with Cu or Mo are not obtained easily. On the other hand, if 1.00% is exceeded, an increase in cost is caused. Therefore, in the case where Ni contained, the amount of Ni is specified to be 0.05% or more and 1.00% or less.

The balance other than those described above is composed of Fe and incidental impurities.

Next, the method for manufacturing a high strength galvanized steel sheet, according to embodiments of the present invention, and reasons for the preferred limitation thereof will be described.

A steel containing the above-described chemical composition is hot-rolled and, thereafter, is cold-rolled to produce a steel sheet. Subsequently, an annealing and galvanization treatment is performed in a continuous galvanizing line. In this regard, in the present invention, a maximum steel sheet temperature in an annealing furnace is preferably 600° C. or higher and 700° C. or lower, a steel sheet transit time in a temperature region of the maximum steel sheet temperature of 600° C. or higher and 700° C. or lower is preferably specified to be 30 seconds or more and 10 minutes or less, and a dew point in an atmosphere is preferably specified to be −45° C. or lower. This is the most beneficial feature of the present invention.

Hot Rolling

The hot rolling can be performed under the condition employed usually.

Pickling

Preferably, a pickling treatment is performed after the hot rolling. Scales generated on the surface of steel sheet are removed in the pickling step, and then, cold rolling is performed. In this regard, the pickling condition is not specifically limited.

Cold Rolling

Preferably, the cold rolling is performed at a reduction rate of 40% or more and 80% or less. If the reduction rate is less than 40%, the recrystallization temperature is lowered and, thereby, the mechanical properties are degraded easily. On the other hand, if the reduction rate is more than 80%, not only the rolling cost increases because of a high strength steel sheet but also the coating characteristics are degraded because surface concentration in the annealing increases.

The cold rolled steel sheet is annealed and is subjected to a galvanization treatment.

In the annealing furnace, a heating step to heat the steel sheet to a predetermined temperature is performed in a heating zone in the former part, and a soaking step to hold the steel sheet at a predetermined temperature for a predetermined time is performed in a soaking zone in the latter part.

As described above, the annealing and galvanization treatment is performed while a maximum steel sheet temperature in the annealing furnace is controlled to be 600° C. or higher and 700° C. or lower, a steel sheet transit time in a temperature region of the maximum steel sheet temperature of 600° C. or higher and 700° C. or lower is controlled to be 30 seconds or more and 10 minutes or less, and a dew point in an atmosphere is controlled to be −45° C. or lower.

In this regard, if the volume fraction of $H_2$ in the atmosphere is less than 1%, an activation effect due to reduction is not obtained and the coating peel resistance is degraded. The upper limit is not specified, although if 75% is exceeded, the cost increases and the effects are saturated. Therefore, the volume fraction of $H_2$ is preferably 1% or more and 75% or less. Meanwhile, the remainder is composed of $N_2$ and incidental impurity gases. Other gas components, e.g., $H_2O$, $CO_2$, and CO, may be contained insofar as the effects of the present invention are not impaired.

The galvanization treatment can be performed by a common method.

Next, an alloying treatment is performed as necessary. In the case where the alloying treatment is performed following the galvanization treatment, after the galvanization treatment is performed, preferably, the alloying treatment is performed by heating the steel sheet to 450° C. or higher and 600° C. or lower in such a way that the Fe content in the zinc coating layer becomes 8% to 14%. If the Fe content is less than 8%, alloying variations occur and the flaking property is degraded. On the other hand, if 14% is exceeded, the coating peel resistance is degraded.

In this manner, the high strength galvanized steel sheet according to the present invention is obtained. The high strength galvanized steel sheet according to the present invention preferably has a zinc coating layer with an amount of deposition of coating of 20 to 120 g/m² per one surface on the surface of a base steel sheet. If the amount of deposition is less than 20 g/m², it becomes difficult to ensure the corrosion resistance. On the other hand, if 120 g/m² is exceeded, the coating peel resistance is degraded. As described below, the features are included in the structure of the base steel sheet surface just below the zinc coating layer. Amount of oxides of at least one selected from Fe, Si, Mn, Al, P, and in addition, B, Nb, Ti, Cr, Mo, Cu, and Ni in a surface layer within 100 μm from the base steel sheet surface just below the zinc coating layer is reduced to less than 0.030 g/m² per one surface in total.

In order to satisfy the corrosion resistance and the coating peel resistance at severe forming of the galvanized steel sheet in which Si and large amounts of Mn are added to the steel, it is preferred to minimize internal oxidation, which may become a starting point of corrosion, cracking at severe forming, and the like, of the base steel surface layer just below the zinc coating layer. Then, in the present invention, to begin with, the oxygen potential is preferably reduced in the annealing step in order to ensure the wettability and, thereby, the activities of Si, Mn, and the like serving as easy-to-oxidize elements are preferably reduced in the base steel surface layer. Such reduction in the activity suppresses external oxidation of these elements and, as a result, the wettability is improved. Also, internal oxidation formed in the base steel surface layer is suppressed and the corrosion resistance and the formability are improved. Such effects are observed by reducing the amount of oxides of at least one selected from Fe, Si, Mn, Al, P, and in addition, B, Nb, Ti, Cr, Mo, Cu, and Ni in the surface layer within 100 μm from the base steel sheet surface to less than 0.030 g/m² in total.

If the total of the amount of oxides (hereafter referred to as the amount of internal oxidation) is 0.030 g/m² or more, the corrosion resistance and the formability are degraded. In this regard, if the amount of internal oxidation is reduced to less than 0.0001 g/m², the effects of improving the corrosion resistance and the formability are saturated. Therefore, the lower limit of the amount of internal oxidation is preferably 0.0001 g/m² or more.

Furthermore, in addition to that described above, in the present invention, it is preferable that the steel microstructure, in which Si, Mn base composite oxides grow, be a mild ferrite phase having good formability in order to improve the coating peel resistance.

EXAMPLES

The present invention will be specifically described below with reference to the examples.

The hot rolled steel sheets having a chemical composition shown in Table 1 were pickled to remove scales and, thereafter, cold rolled under the condition shown in Table 2, so that cold rolled steel sheets having a thickness of 1.0 mm were obtained.

TABLE 1

| Steel symbol | C | Si | Mn | Al | P | S | Cr | Mo | B | Nb | Cu | Ni | Ti |
|---|---|---|---|---|---|---|---|---|---|---|---|---|---|
| | | | | | | | | | | | | (percent by mass) | |
| A | 0.12 | 0.03 | 4.5 | 0.03 | 0.01 | 0.004 | — | — | — | — | — | — | — |
| B | 0.03 | 0.03 | 4.6 | 0.03 | 0.01 | 0.004 | — | — | — | — | — | — | — |
| C | 0.35 | 0.03 | 4.7 | 0.02 | 0.01 | 0.004 | — | — | — | — | — | — | — |
| D | 0.12 | 0.10 | 4.5 | 0.03 | 0.01 | 0.004 | — | — | — | — | — | — | — |
| E | 0.13 | 0.30 | 4.7 | 0.04 | 0.01 | 0.004 | — | — | — | — | — | — | — |
| F | 0.12 | 0.50 | 4.6 | 0.03 | 0.01 | 0.004 | — | — | — | — | — | — | — |
| G | 0.12 | 0.03 | 3.6 | 0.02 | 0.01 | 0.004 | — | — | — | — | — | — | — |
| H | 0.13 | 0.03 | 6.3 | 0.03 | 0.01 | 0.004 | — | — | — | — | — | — | — |
| I | 0.12 | 0.03 | 8.0 | 0.02 | 0.01 | 0.004 | — | — | — | — | — | — | — |
| J | 0.13 | 0.03 | 4.5 | 0.30 | 0.01 | 0.004 | — | — | — | — | — | — | — |
| K | 0.12 | 0.03 | 4.6 | 1.00 | 0.01 | 0.004 | — | — | — | — | — | — | — |
| L | 0.12 | 0.03 | 4.7 | 0.03 | 0.05 | 0.004 | — | — | — | — | — | — | — |
| M | 0.12 | 0.03 | 4.5 | 0.02 | 0.10 | 0.004 | — | — | — | — | — | — | — |
| N | 0.13 | 0.02 | 4.7 | 0.03 | 0.01 | 0.009 | — | — | — | — | — | — | — |
| O | 0.12 | 0.03 | 4.6 | 0.02 | 0.01 | 0.004 | 0.8 | — | — | — | — | — | — |
| P | 0.13 | 0.03 | 4.5 | 0.03 | 0.01 | 0.004 | — | 0.1 | — | — | — | — | — |
| Q | 0.13 | 0.02 | 4.7 | 0.03 | 0.01 | 0.004 | — | — | 0.003 | — | — | — | — |
| R | 0.12 | 0.03 | 4.5 | 0.05 | 0.01 | 0.004 | — | — | 0.001 | 0.03 | — | — | — |
| S | 0.13 | 0.03 | 4.5 | 0.03 | 0.01 | 0.004 | — | 0.1 | — | — | 0.1 | 0.2 | — |
| T | 0.12 | 0.02 | 4.7 | 0.04 | 0.01 | 0.004 | — | — | 0.001 | — | — | — | 0.02 |
| U | 0.13 | 0.03 | 4.6 | 0.03 | 0.01 | 0.004 | — | — | — | — | — | — | 0.05 |
| <u>XA</u> | <u>0.02</u> | 0.02 | 4.6 | 0.03 | 0.01 | 0.004 | — | — | — | — | — | — | — |
| <u>XB</u> | <u>0.36</u> | 0.03 | 4.7 | 0.02 | 0.01 | 0.004 | — | — | — | — | — | — | — |
| <u>XC</u> | 0.12 | <u>0.60</u> | 4.5 | 0.03 | 0.01 | 0.004 | — | — | — | — | — | — | — |
| <u>XD</u> | 0.13 | 0.03 | <u>3.5</u> | 0.03 | 0.01 | 0.004 | — | — | — | — | — | — | — |
| <u>XE</u> | 0.12 | 0.03 | 4.6 | <u>1.10</u> | 0.01 | 0.004 | — | — | — | — | — | — | — |
| <u>XF</u> | 0.13 | 0.02 | 4.5 | 0.03 | <u>0.11</u> | 0.004 | — | — | — | — | — | — | — |
| <u>XG</u> | 0.12 | 0.02 | 4.7 | 0.04 | 0.01 | <u>0.020</u> | — | — | — | — | — | — | — |

Underlied data are out of the scope of the present invention

Subsequently, the cold rolled steel sheets obtained as described above was put into a CGL provided with a furnace of all radiant tube type for annealing. In CGL, as shown in Table 2, sheets were annealed while a dew point, a steel sheet transit time, and a maximum steel sheet temperature were controlled, and, thereafter, a galvanization treatment was performed with an Al-containing Zn bath at 460° C. In this regard, as for a control of the dew point in the atmosphere, a piping arrangement, through which a $N_2$ gas humidified by heating a water tank disposed in $N_2$ was passed, was disposed separately, a $H_2$ gas was introduced and mixed into the humidified $N_2$ gas, this mixed gas was introduced into the furnace and, thereby, the dew point in the atmosphere was controlled.

Also, a 0.14% Al-containing Zn bath was used for GA, and a 0.18% Al-containing Zn bath was used for GI. The amount of deposition of coating was adjusted by gas wiping, and an alloying treatment was performed for GA.

The appearance (coating appearance), the corrosion resistance, the coating peel resistance at severe forming, and the formability of the thus obtained galvanized steel sheets (GA and GI) were examined. Also, the amount of oxides present in a surface layer within 100 μm from the base steel sheet of just below the zinc coating layer (amount of internal oxidation) was measured. The measuring methods and the evaluation criteria are as described below.

<Appearance (Coating Appearance)>
As for the appearance, the case where there was no poor appearance, e.g., coating defects and alloying variations, was evaluated as good (symbol ○), and the case where there was poor appearance was evaluated as poor (symbol x).

<Corrosion Resistance>
A galvannealed steel sheet having a dimension of 70 mm×150 mm was subjected to the salt spray test on the basis of JIS Z 2371 (2000) for 3 days, corrosion products were removed by washing for 1 minute by using chromic acid (concentration 200 g/L, 80° C.), the coating corrosion weight loss (g/m²·day) per one surface based on the weights before and after the test was measured by a gravimetric method, and evaluation was performed on the basis of the criteria described below.
○(good): less than 20 g/m²·day
x (poor): 20 g/m²·day or more <Coating Peel Resistance>
As for the coating peel resistance at severe forming, when GA is subjected to bending of more than 90°, suppression of coating peel of a bent portion is required. In the present example, a cellophane tape (registered trademark) was pushed against a bent portion in the case of 120° bending and peeled, thus peeled substances were transferred to the cellophane tape (registered trademark), and the amount of peeled substances on the cellophane tape (registered trademark) was determined as the number of Zn counts on the basis of a fluorescent X-ray method. In this regard, the mask diameter was 30 mm, the acceleration voltage of fluorescent X-ray was 50 kV, the acceleration current was 50 mA, and the measurement time was 20 seconds at this time. In the light of the criteria described below, those of ranks 1 and 2 were evaluated as good coating peel resistance (symbol ○), and those of rank 3 or greater were evaluated as poor coating peel resistance (symbol x).

The number of Zn counts by fluorescent X-ray Rank
0 or more and less than 500: 1 (good)
500 or more and less than 1,000: 2
1,000 or more and less than 2,000: 3
2,000 or more and less than 3,000: 4
3,000 or more: 5 (poor)

GI is required to have the coating peel resistance in an impact test. A ball impact test was performed, the formed portion was subjected to tape peeling, and presence or absence of coating layer peel was evaluated visually. The ball impact condition was a ball weight of 1,000 g and a drop height of 100 cm.
○: coating layer was not peeled
x: coating layer was peeled <Formability>
As for the formability, a JIS No. 5 tensile test piece was taken from the samples GA and GI in a direction 90° to the rolling direction, and a tensile test was performed in conformity with the specification of JIS Z 2241 at a constant cross head speed of 10 mm/min to measure the tensile strength (TS/MPa) and the elongation (El %). TS×El≥24,000 was evaluated as good and TS×El<24,000 was evaluated as poor.

<Amount of Internal Oxidation in a Surface Region within 100 μm from the Base Steel Sheet Just Below Zinc Coating Layer>
The amount of internal oxidation was measured by "the impulse furnace fusion-infrared absorption method". In this regard, it is necessary that the amount of oxygen contained in the base steel sheet before application of annealing be subtracted. Therefore, in the present invention, the surface layers of both surfaces of the steel sheet after continuous annealing were polished by 100 μm or more, the oxygen concentration in steel was measured as an amount of oxygen OH contained in the base steel sheet. Also, the oxygen concentration in steel in the whole sheet thickness direction of the base steel sheet after continuous annealing was measured as an amount of oxygen OI after internal oxidation. A difference between OI and OH (=OI−OH) was calculated by using the thus obtained amount of oxygen OI after the internal oxidation of the base steel sheet and the amount of oxygen OH contained in the base steel sheet and, furthermore, the value (g/m²) converted to the amount per one surface unit area (that is, 1 m²) as an amount of internal oxidation.

The thus obtained results are shown in Table 2 together with the production conditions.

TABLE 2

| | | Steel | | Production method | | | | | Amount | |
| | | | | | Annealing furnace | | | | | |
| No. | Symbol | Si (percent by mass) | Mn (percent by mass) | cold rolling reduction rate (%) | Dew point in 600-700° C. (C.) | Maximum steel sheet temperature (C.) | Steel sheet transit time in 600-700° C. (min) | Albying temperature (° C.) | of internal oxidation (g/m²) | Amount of deposition (g/m²) |
|---|---|---|---|---|---|---|---|---|---|---|
| 1 | A | 0.03 | 4.5 | 50 | −30 | 650 | 1.5 | 500 | 0.051 | 50 |
| 2 | A | 0.03 | 4.5 | 50 | −37 | 650 | 1.5 | 500 | 0.045 | 50 |
| 3 | A | 0.03 | 4.5 | 50 | −44 | 650 | 1.5 | 500 | 0.033 | 50 |
| 4 | A | 0.03 | 4.5 | 50 | −45 | 650 | 1.5 | 500 | 0.028 | 50 |
| 5 | A | 0.03 | 4.5 | 50 | −47 | 650 | 1.5 | 500 | 0.018 | 50 |
| 6 | A | 0.03 | 4.5 | 50 | −50 | 650 | 1.5 | 500 | 0.011 | 50 |
| 7 | A | 0.03 | 4.5 | 50 | −47 | 650 | 0.2 | 500 | 0.010 | 50 |
| 8 | A | 0.03 | 4.5 | 50 | −47 | 650 | 0.4 | 500 | 0.011 | 50 |
| 9 | A | 0.03 | 4.5 | 50 | −47 | 650 | 0.5 | 500 | 0.012 | 50 |

TABLE 2-continued

| | | | | | | | | | | |
|---|---|---|---|---|---|---|---|---|---|---|
| 10 | A | 0.03 | 4.5 | 50 | −47 | 650 | 1.0 | 500 | 0.015 | 50 |
| 11 | A | 0.03 | 4.5 | 50 | −47 | 650 | 10.0 | 500 | 0.025 | 50 |
| 12 | A | 0.03 | 4.5 | 50 | −47 | 590 | 1.5 | 500 | 0.018 | 50 |
| 13 | A | 0.03 | 4.5 | 50 | −47 | 600 | 1.5 | 500 | 0.019 | 50 |
| 14 | A | 0.03 | 4.5 | 50 | −47 | 700 | 1.5 | 500 | 0.018 | 50 |
| 15 | A | 0.03 | 4.5 | 50 | −47 | 720 | 1.5 | 500 | 0.016 | 50 |
| 16 | A | 0.03 | 4.5 | 50 | −47 | 650 | 1.5 | no albying | 0.018 | 50 |
| 17 | A | 0.03 | 4.5 | 50 | −40 | 650 | 1.5 | no albying | 0.035 | 50 |
| 18 | A | 0.03 | 4.5 | 50 | −47 | 650 | 1.5 | no albying | 0.020 | 50 |
| 19 | A | 0.03 | 4.5 | 50 | −50 | 650 | 1.5 | no albying | 0.013 | 50 |
| 20 | A | 0.03 | 4.5 | 50 | −47 | 650 | 1.5 | 460 | 0.017 | 50 |
| 21 | A | 0.03 | 4.5 | 50 | −47 | 650 | 1.5 | 550 | 0.016 | 50 |
| 22 | A | 0.03 | 4.5 | 50 | −47 | 650 | 1.5 | 500 | 0.019 | 17 |
| 23 | A | 0.03 | 4.5 | 50 | −47 | 650 | 1.5 | 500 | 0.018 | 20 |
| 24 | A | 0.03 | 4.5 | 50 | −47 | 650 | 1.5 | 500 | 0.019 | 90 |
| 25 | A | 0.03 | 4.5 | 50 | −47 | 650 | 1.5 | 500 | 0.020 | 120 |
| 26 | A | 0.03 | 4.5 | 50 | −47 | 650 | 1.5 | 500 | 0.021 | 130 |
| 27 | B | 0.03 | 4.6 | 50 | −47 | 650 | 1.5 | 500 | 0.018 | 50 |
| 28 | C | 0.03 | 4.7 | 50 | −47 | 650 | 1.5 | 500 | 0.017 | 50 |
| 29 | D | 0.1 | 4.5 | 50 | −47 | 650 | 1.5 | 500 | 0.020 | 50 |
| 30 | E | 0.3 | 4.7 | 50 | −47 | 650 | 1.5 | 500 | 0.023 | 50 |
| 31 | F | 0.5 | 4.6 | 50 | −47 | 650 | 1.5 | 500 | 0.028 | 50 |
| 32 | G | 0.03 | 3.6 | 50 | −47 | 650 | 1.5 | 500 | 0.019 | 50 |
| 33 | H | 0.03 | 6.3 | 50 | −47 | 650 | 1.5 | 500 | 0.017 | 50 |
| 34 | I | 0.03 | 8.0 | 50 | −47 | 650 | 1.5 | 500 | 0.018 | 50 |
| 35 | J | 0.03 | 4.5 | 50 | −47 | 650 | 1.5 | 500 | 0.021 | 50 |
| 36 | K | 0.03 | 4.6 | 50 | −47 | 650 | 1.5 | 500 | 0.019 | 50 |
| 37 | L | 0.03 | 4.7 | 50 | −47 | 650 | 1.5 | 500 | 0.017 | 50 |
| 38 | M | 0.03 | 4.5 | 50 | −47 | 650 | 1.5 | 500 | 0.018 | 50 |
| 39 | N | 0.02 | 4.7 | 50 | −47 | 650 | 1.5 | 500 | 0.019 | 50 |
| 40 | O | 0.03 | 4.6 | 50 | −47 | 650 | 1.5 | 500 | 0.021 | 50 |
| 41 | P | 0.03 | 4.5 | 50 | −47 | 650 | 1.5 | 500 | 0.022 | 50 |
| 42 | Q | 0.02 | 4.7 | 50 | −47 | 650 | 1.5 | 500 | 0.019 | 50 |
| 43 | R | 0.03 | 4.5 | 50 | −47 | 650 | 1.5 | 500 | 0.018 | 50 |
| 44 | S | 0.03 | 4.5 | 50 | −47 | 650 | 1.5 | 500 | 0.019 | 50 |
| 45 | T | 0.02 | 4.7 | 50 | −47 | 650 | 1.5 | 500 | 0.020 | 50 |
| 46 | U | 0.03 | 4.6 | 50 | −47 | 650 | 1.5 | 500 | 0.018 | 50 |
| 47 | XA | 0.02 | 4.6 | 50 | −47 | 650 | 1.5 | 500 | 0.058 | 50 |
| 48 | XB | 0.03 | 4.7 | 50 | −47 | 650 | 1.5 | 500 | 0.018 | 50 |
| 49 | XC | 0.6 | 4.5 | 50 | −47 | 650 | 1.5 | 500 | 0.058 | 50 |
| 50 | XD | 0.03 | 3.5 | 50 | −47 | 650 | 1.5 | 500 | 0.025 | 50 |
| 51 | XE | 0.03 | 4.6 | 50 | −47 | 650 | 1.5 | 500 | 0.022 | 50 |
| 52 | XF | 0.02 | 4.5 | 50 | −47 | 650 | 1.5 | 500 | 0.019 | 50 |
| 53 | XG | 0.02 | 4.7 | 50 | −47 | 650 | 1.5 | 500 | 0.018 | 50 |

| No. | Coating species | Fe content in coating layer (percent by mass) | Coating appearance | Corrision resistance | Coating peel resistance | TS (MPa) | EI (%) | TS × EL | Formability | Remarks |
|---|---|---|---|---|---|---|---|---|---|---|
| 1 | GA | 10 | × | × | × | 1023 | 20.5 | 20972 | poor | Comparative example |
| 2 | GA | 10 | × | ○ | × | 1029 | 21.6 | 22226 | poor | Comparative example |
| 3 | GA | 10 | ○ | ○ | × | 1025 | 22.7 | 23268 | poor | Comparative example |
| 4 | GA | 10 | ○ | ○ | ○ | 1046 | 23.8 | 24895 | good | Invention example |
| 5 | GA | 10 | ○ | ○ | ○ | 1055 | 25.6 | 27008 | good | Invention example |
| 6 | GA | 10 | ○ | ○ | ○ | 1068 | 26.7 | 28516 | good | Invention example |
| 7 | GA | 10 | ○ | ○ | ○ | 1012 | 22.6 | 22871 | poor | Comparative example |
| 8 | GA | 10 | ○ | ○ | ○ | 1029 | 23.3 | 23976 | poor | Comparative example |
| 9 | GA | 10 | ○ | ○ | ○ | 1044 | 24.2 | 25265 | good | Invention example |
| 10 | GA | 10 | ○ | ○ | ○ | 1049 | 24.6 | 25805 | good | Invention example |
| 11 | GA | 10 | ○ | ○ | ○ | 1098 | 25.7 | 28219 | good | Invention example |
| 12 | GA | 10 | ○ | ○ | ○ | 978 | 23.5 | 22983 | poor | Comparative example |
| 13 | GA | 10 | ○ | ○ | ○ | 1003 | 24.0 | 24072 | good | Invention example |
| 14 | GA | 10 | ○ | ○ | ○ | 1032 | 25.8 | 26626 | good | Invention example |
| 15 | GA | 10 | × | ○ | ○ | 1069 | 26.1 | 27901 | good | Comparative example |
| 16 | G1 | 1 | ○ | ○ | ○ | 1060 | 25.4 | 26924 | good | Invention example |
| 17 | G1 | 1 | × | ○ | × | 1025 | 24.5 | 25113 | good | Comparative example |
| 18 | G1 | 1 | ○ | ○ | ○ | 1045 | 25.1 | 26230 | good | Invention example |
| 19 | G1 | 1 | ○ | ○ | ○ | 1049 | 24.8 | 26015 | good | Invention example |
| 20 | GA | 8 | ○ | ○ | ○ | 1055 | 24.8 | 26164 | good | Invention example |
| 21 | GA | 13 | ○ | ○ | ○ | 1061 | 24.6 | 26101 | good | Invention example |
| 22 | GA | 10 | ○ | × | ○ | 1053 | 25.0 | 26325 | good | Comparative example |
| 23 | GA | 10 | ○ | ○ | ○ | 1054 | 24.1 | 25401 | good | Invention example |
| 24 | GA | 10 | ○ | ○ | ○ | 1068 | 24.9 | 26593 | good | Invention example |
| 25 | GA | 10 | ○ | ○ | ○ | 1053 | 25.1 | 26430 | good | Invention example |
| 26 | GA | 10 | ○ | ○ | × | 1056 | 25.4 | 26822 | good | Comparative example |
| 27 | GA | 10 | ○ | ○ | ○ | 620 | 39.6 | 24552 | good | Invention example |
| 28 | GA | 10 | ○ | ○ | ○ | 1311 | 19.8 | 25958 | good | Invention example |
| 29 | GA | 10 | ○ | ○ | ○ | 1055 | 24.5 | 25848 | good | Invention example |

TABLE 2-continued

| | | | | | | | | | |
|---|---|---|---|---|---|---|---|---|---|
| 30 | GA | 10 | ○ | ○ | ○ | 756 | 35.6 | 26914 | good | Invention example |
| 31 | GA | 10 | ○ | ○ | ○ | 1054 | 26.0 | 27404 | good | Invention example |
| 32 | GA | 10 | ○ | ○ | ○ | 1048 | 24.5 | 25676 | good | Invention example |
| 33 | GA | 10 | ○ | ○ | ○ | 1063 | 25.2 | 26788 | good | Invention example |
| 34 | GA | 10 | ○ | ○ | ○ | 1054 | 24.1 | 25401 | good | Invention example |
| 35 | GA | 10 | ○ | ○ | ○ | 1066 | 24.9 | 26543 | good | Invention example |
| 36 | GA | 10 | ○ | ○ | ○ | 1049 | 25.0 | 26225 | good | Invention example |
| 37 | GA | 10 | ○ | ○ | ○ | 1042 | 24.7 | 25737 | good | Invention example |
| 38 | GA | 10 | ○ | ○ | ○ | 1046 | 24.9 | 26045 | good | Invention example |
| 39 | GA | 10 | ○ | ○ | ○ | 1050 | 24.6 | 25830 | good | Invention example |
| 40 | GA | 10 | ○ | ○ | ○ | 1053 | 24.5 | 25799 | good | Invention example |
| 41 | GA | 10 | ○ | ○ | ○ | 1048 | 26.0 | 27248 | good | Invention example |
| 42 | GA | 10 | ○ | ○ | ○ | 1051 | 24.1 | 25329 | good | Invention example |
| 43 | GA | 10 | ○ | ○ | ○ | 1038 | 23.9 | 24808 | good | Invention example |
| 44 | GA | 10 | ○ | ○ | ○ | 1033 | 25.8 | 26651 | good | Invention example |
| 45 | GA | 10 | ○ | ○ | ○ | 1041 | 25.4 | 26441 | good | Invention example |
| 46 | GA | 10 | ○ | ○ | ○ | 1049 | 26.0 | 27274 | good | Invention example |
| 47 | GA | 10 | × | ○ | × | 608 | 38.5 | 23408 | poor | Comparative example |
| 48 | GA | 10 | ○ | ○ | ○ | 1452 | 16.2 | 23522 | poor | Comparative example |
| 49 | GA | 10 | × | ○ | × | 1067 | 25.7 | 27422 | good | Comparative example |
| 50 | GA | 10 | ○ | ○ | × | 1080 | 22.0 | 23760 | poor | Comparative example |
| 51 | GA | 10 | × | ○ | ○ | 1072 | 24.8 | 26586 | good | Comparative example |
| 52 | GA | 10 | × | ○ | × | 1049 | 21.0 | 22029 | poor | Comparative example |
| 53 | GA | 10 | ○ | ○ | ○ | 1055 | 19.5 | 20573 | poor | Comparative example |

Underlined data are production conditions out of the scope of the present invention As is clear from Table 2, GI and GA (Invention examples) produced by the method according to the present invention have good corrosion resistance, formability, coating peel resistance at severe forming, and coating appearance in spite of being high strength steel sheets containing large amounts of easy-to-oxidize elements, e.g., Si and Mn.

On the other hand, in Comparative examples, at least one of coating appearance, corrosion resistance, formability, and coating peel resistance at severe forming is poor.

The high strength galvanized steel sheet according to the present invention has excellent coating appearance, corrosion resistance, formability, and coating peel resistance at severe forming and can be utilized as a coated steel sheet to reduce the weight and enhance the strength of car body in itself of automobiles. Also, the high strength galvanized steel sheet according to the present invention to which rust preventive properties are given can be applied as a coated steel sheet to wide fields, e.g., the fields of home appliances and constructions, other than automobiles.

The invention claimed is:

1. A method for manufacturing a high strength galvanized steel sheet having a zinc coating layer with an amount of deposition of coating of 20 to 120 g/m² per one surface on the surface of a base steel sheet having a chemical composition comprising C: 0.03% to 0.35%, Si: 0.01% to 0.50%, Mn: 3.6% to 8.0%, Al: 0.001% to 1.000%, P≤0.10%, S≤0.010%, and the balance comprising Fe and incidental impurities, on a percent by mass basis, the method comprising the step of subjecting the base steel sheet to annealing and galvanization treatment in a continuous galvanizing line, wherein:

the maximum steel sheet temperature in an annealing furnace is 600° C. or higher and 700° C. or lower, and the steel sheet transit time in a temperature region of the maximum steel sheet temperature of 600° C. or higher and 700° C. or lower is specified to be 30 seconds or more and 10 minutes or less, and the dew point in an atmosphere is specified to be −45° C. or lower; and an amount of oxides of at least one selected from Fe, Si, Mn, Al and P generated in a surface layer within 100 μm from the base steel sheet surface just below the zinc coating layer is reduced to less than 0.030 g/m² per one surface.

2. The method for manufacturing a high strength galvanized steel sheet, according to claim 1, wherein after the galvanization treatment is applied, an alloying treatment is further applied by heating the steel sheet to a temperature of 450° C. or higher and 600° C. or lower to specify the Fe content in the zinc coating layer to be within the range of 8 to 14 percent by mass.

3. A method for manufacturing a high strength galvanized steel sheet having a zinc coating layer with an amount of deposition of coating of 20 to 120 g/m² per one surface on the surface of a base steel sheet having a chemical composition comprising C: 0.03% to 0.35%, Si: 0.01% to 0.50%, Mn: 3.6% to 8.0%, Al: 0.001% to 1.000%, P≤0.10%, S≤0.010%, at least one selected from B: 0.001% to 0.005%, Nb: 0.005% to 0.050%, Ti: 0.005% to 0.050%, Cr: 0.001% to 1.000%, Mo: 0.05% to 1.00%, Cu: 0.05% to 1.00%, and Ni: 0.05% to 1.00%, and the balance comprising Fe and incidental impurities, on a percent by mass basis, the method comprising the step of subjecting the base steel sheet to annealing and galvanization treatment in a continuous galvanizing line, wherein:

the maximum steel sheet temperature in an annealing furnace is 600° C. or higher and 700° C. or lower, and the steel sheet transit time in a temperature region of the maximum steel sheet temperature of 600° C. or higher and 700° C. or lower is specified to be 30 seconds or more and 10 minutes or less, and the dew point in an atmosphere is specified to be −45° C. or lower; and an amount of oxides of at least one selected from Fe, Si, Mn, Al, P, B, Nb, Ti, Cr, Mo, Cu, and Ni generated in a surface layer within 100 μm from the base steel sheet surface just below the zinc coating layer are less than 0.030 g/m² per one surface.

4. The method for manufacturing a high strength galvanized steel sheet, according to claim 3, wherein after the galvanization treatment is applied, an alloying treatment is further applied by heating the steel sheet to a temperature of 450° C. or higher and 600° C. or lower to specify the Fe content in the zinc coating layer to be within the range of 8 to 14 percent by mass.

5. The method for manufacturing a high strength galvanized steel sheet, according to claim 3, wherein the base steel sheet has a chemical composition consisting of C: 0.03% to 0.35%, Si: 0.01% to 0.50%, Mn: 3.6% to 8.0%, Al: 0.001% to 1.000%, P≤0.10%, S≤0.010%, at least one selected from B: 0.001% to 0.005%, Nb: 0.005% to 0.050%, Ti: 0.005% to 0.050%, Cr: 0.001% to 1.000%, Mo: 0.05% to 1.00%, Cu: 0.05% to 1.00%, and Ni: 0.05% to 1.00%, and the balance consisting of Fe and incidental impurities.

6. The method for manufacturing a high strength galvanized steel sheet, according to claim 3, wherein the amount of oxides of at least one selected from Fe, Si, Mn, Al and P generated in a surface layer within 100 µm from the base steel sheet surface just below the zinc coating layer is reduced to less than 0.030 g/m$^2$ per one surface.

* * * * *